United States Patent [19]
Kudo et al.

[11] 3,914,390
[45] Oct. 21, 1975

[54] METHOD FOR REDUCING NITROGEN OXIDES

[75] Inventors: Tetsuichi Kudo, Tokyo; Toshikatsu Manabe, Ome; Kazuetsu Yoshida, Kokubunji; Tetsuo Gejyo, Tokyo; Michiharu Seki, Fuchu, all of Japan

[73] Assignee: Hitachi, Ltd., Japan

[22] Filed: Sept. 18, 1973

[21] Appl. No.: 398,449

[30] Foreign Application Priority Data
Sept. 20, 1972 Japan............... 47-93594

[52] U.S. Cl. ............ 423/351; 423/213.2; 423/239; 423/244; 252/462
[51] Int. Cl.²................. C01B 21/00; B01D 53/34
[58] Field of Search ..... 423/239, 244, 213.2, 213.7, 423/351

[56] References Cited
UNITED STATES PATENTS

| | | |
|---|---|---|
| 2,204,733 | 6/1940 | Miller ........................... 423/502 |
| 3,226,340 | 12/1965 | Stephens et al. ................ 252/462 |
| 3,429,656 | 2/1969 | Taylor et al. .................... 423/213.7 |
| 3,449,063 | 6/1969 | Griffing et al. .................. 423/213.5 |
| 3,599,427 | 8/1971 | Jones et al. ..................... 423/213.7 |
| 3,714,071 | 1/1973 | Michalko ....................... 423/213.2 X |

*Primary Examiner*—Earl C. Thomas
*Attorney, Agent, or Firm*—Craig & Antonelli

[57] ABSTRACT

Catalysts for conversion of nitrogen oxides comprises a porous ceramic carrier, and 0.1 to 10% by weight of copper oxide in terms of copper metal, 0.1 to 20% by weight of lanthanum oxide in terms of lanthanum metal and 0.01 to 12% by weight of zirconium oxide in terms of zirconium metal, based on the weight of the carrier, these oxides being supported on the carrier. The catalysts are brought in contact with a gas containing nitrogen oxides in the presence of ammonia and sulfur oxides, thereby decomposing and converting the nitrogen oxides.

23 Claims, 8 Drawing Figures

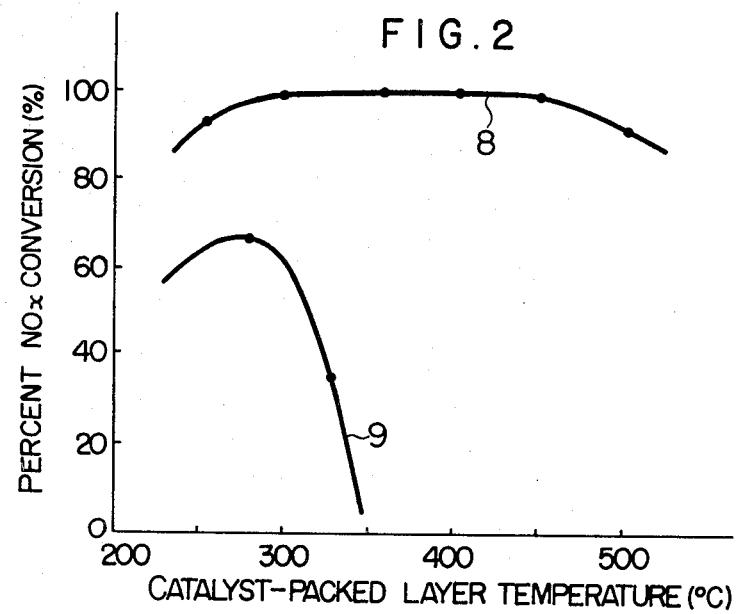
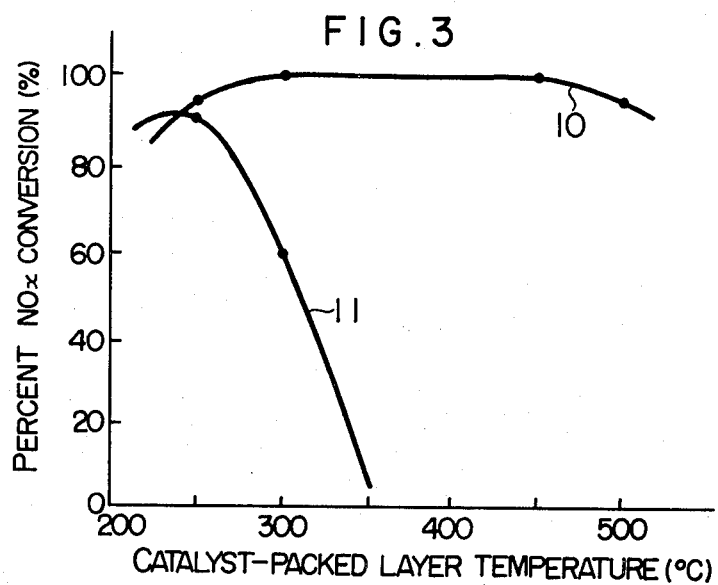

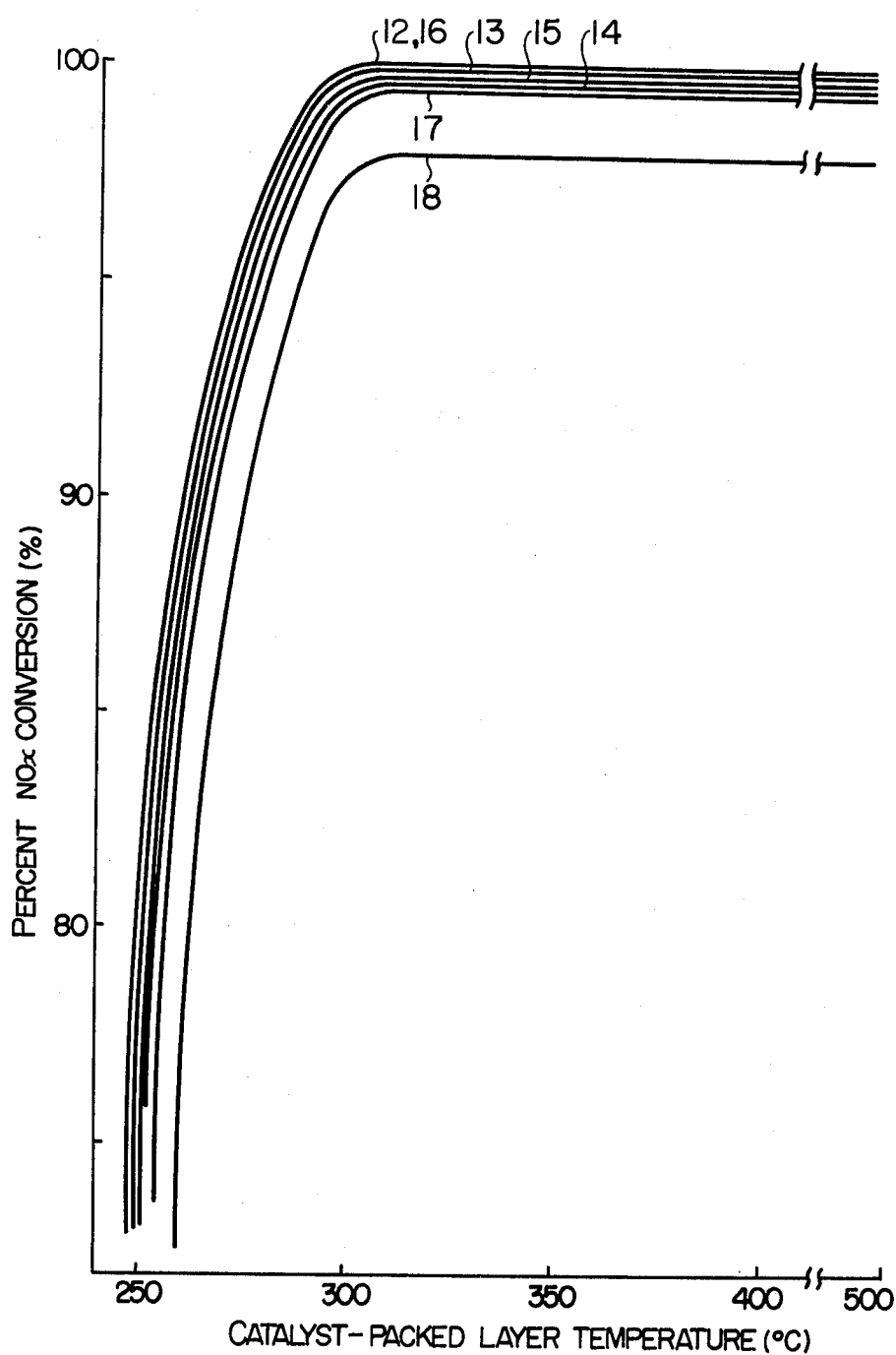

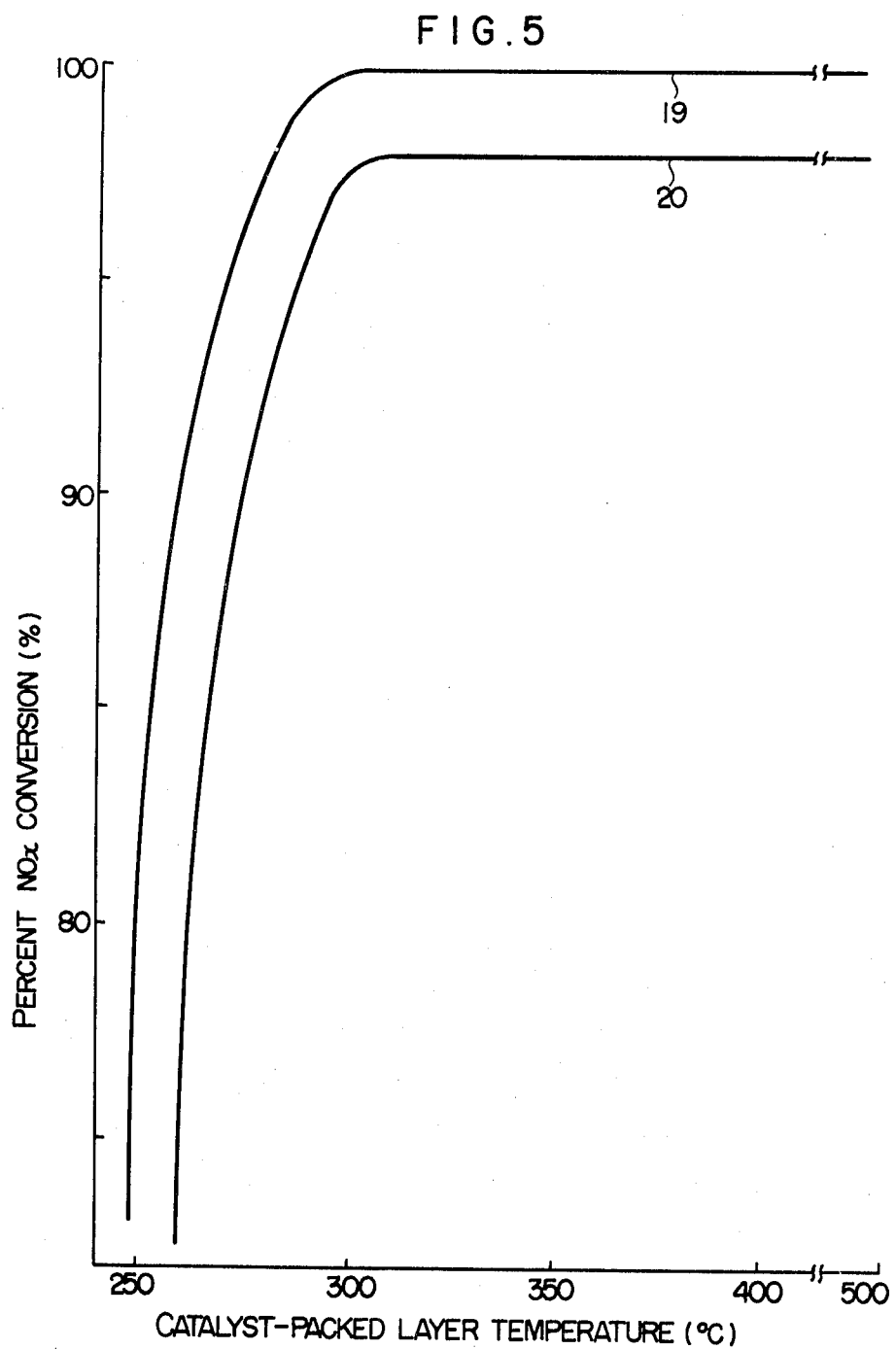

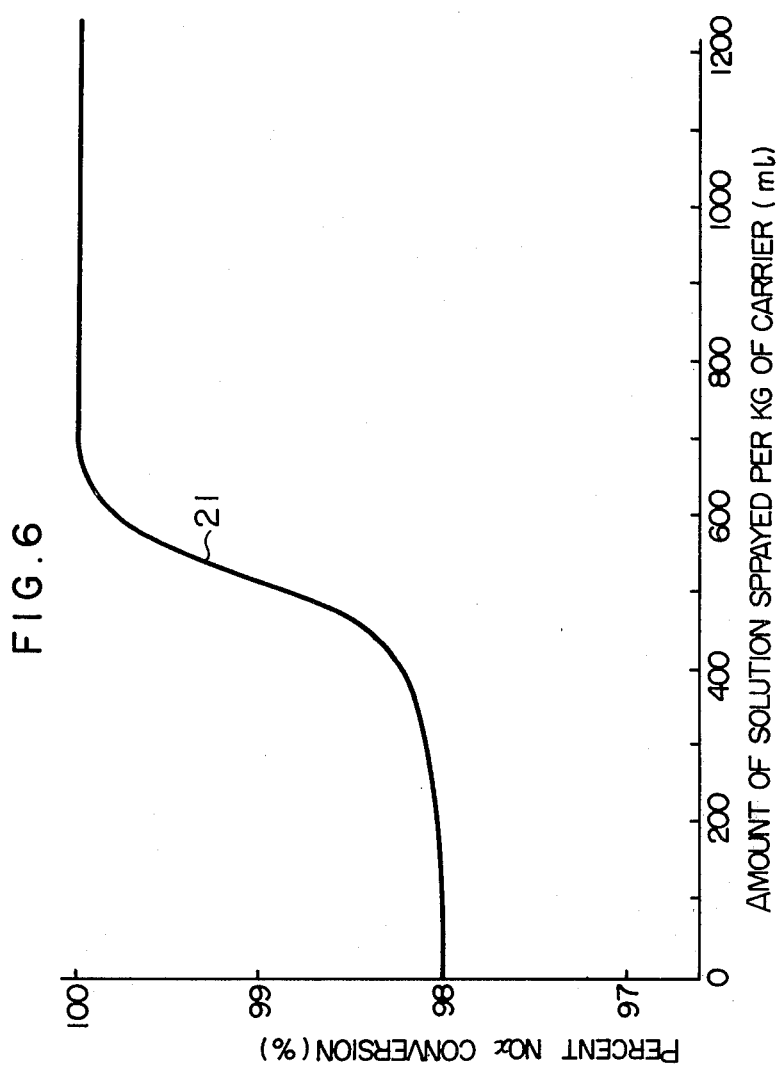

METHOD FOR REDUCING NITROGEN OXIDES

BACKGROUND OF THE INVENTION

This invention relates to catalysts for converting harmful nitrogen oxides (NOx) contained in flue gas from power stations or other boilers, heating furnaces, sintering furnaces, incinerating furances, smelting furnaces, etc. in chemical or other industries, or exhaust gas from internal combustion engines such as gasoline engine, etc., and also to a process for converting the nitrogen oxides.

As a process for converting NOx in the flue gas, it has been so far known that NOx is reduced with reducing gases such as carbon monoxide (CO), hydrogen, hydrocarbons, or ammonia in the presence of platinum or palladium catalysts, thereby decomposing and converting NOx to harmless components such as nitrogen, carbon dioxide or steam. In the conversion of NOx contained in the exhaust gas from the internal combustioin engines in the presence of these catalysts, the conversion proceeds according to the following equation, where carbon monoxide or hydrocarbons usually contained therein is mainly utilized as the reducing agent:

$$NO + CO \rightarrow \tfrac{1}{2} N_2 + CO_2$$

On the other hand, in the case of flue gas from the boilers, etc., no reducing gases are usually contained in the flue gas, and therefore the conversion is carried out by decreasing an air-fuel ratio in the combustion process, thereby increasing the CO concentration of the flue gas or adding hydrogen or ammonia to the flue gas. For example, in the case of ammonia addition, the conversion mainly proceeds according to the following equation:

$$NO + \tfrac{2}{3} NH_3 \rightarrow 5/6 N_2 + H_2O$$

However, the conversion based on these prior art has the following disadvantages.

1. The noble metal catalysts used in these reactions are very expensive.
2. The catalysts are poisoned by sulfur dioxide (SO$_2$) usually contained in the flue gas.
3. In the case of treating the boiler flue gas, the catalysts are influenced with the oxygen contained in the flue gas, and the NOx conversion is abruptly lowered at a temperature of 250°C or higher.
4. In the case of treating the internal combustion exhaust gas, the catalysts are often deactivated, when exposed to a high temperature, for exmaple, 700°C or higher.

It has been also proposed that copper oxide catalysts, tungsten oxide catalysts or molybdenum oxide catalysts are effective for the reaction of NOx with ammonia or carbon monoxide, but these oxide catalysts are also poisoned with SO$_2$, and have less activities than the noble metal catalysts such as the platinum catalysts as mentioned above.

That is, it can be said at the present stage that any other effective process has not been developed yet than the process for controlling the amount of NOx to be produced by adjusting or improving a combustion system, as a process for decreasing NOx in the flue gas.

SUMMARY OF THE INVENTION

An object of the present invention is to utilize catalysts comprising a porous ceramic carrier, and 0.1 to 10 % by weight of copper oxide in terms of copper metal, 0.1 to 20 % by weight of lanthanum oxide in terms of lanthanum metal, and 0.01 to 12 % by weight of zirconium oxide in terms of zirconium metal, based on the weight of the carrier, these oxides being supported on the carrier, in the conversion of harmful nitrogen oxides (NOx) contained in the flue gas from the power stations, boilers, heating furnaces, sintering furnaces, smelting furnaces, etc., or the exhaust gas from internal combustion engine such as gasoline engine, etc.

Another object of the present invention is to provide a process for converting nitrogen oxides by contacting said catalysts with the gas containing the nitrogen oxides in the presence of ammonia and sulfur oxides such as sulfur dioxide gas, thereby decomposing and converting the nitrogen oxides.

Other object of the present invention is to utilize the catalysts activated by contacting said catalysts with a gas containing sulfur oxides or a solution containing sulfur compounds, and then heating the catalysts, as a catalyst for converting the nitrogen oxides.

Further object of the present invention is to provide a process for converting nitrogen oxides by contacting said activated catalysts with a gas containing nitrogen oxides in the presence of ammonia, thereby decomposing and converting the nitrogen oxides.

BRIEF DESCRIPTION OF THE DRAWINGS

FIG. 2, 3, 4 and 5 are diagrams showing relations between the temperature of catalyst-packed layer and conversion of nitrogen oxides (NOx).

FIG. 6 is a diagram showing a relation between the amount of catalyst solution sprayed on the carrier and conversion of NOx.

DESCRIPTION OF THE PREFERRED EMBODIMENTS

Figure 1:
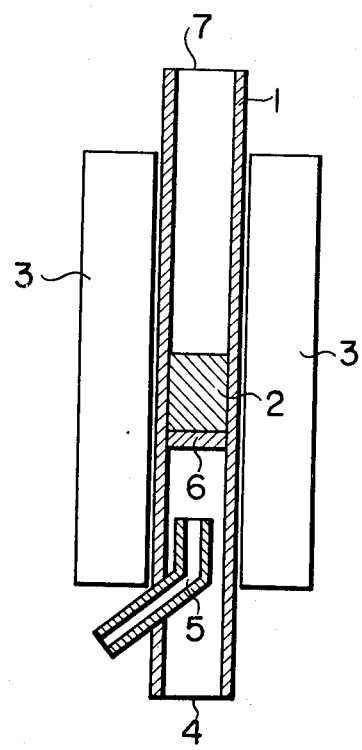
FIG. 1 is a cross-sectional view of an apparatus for converting nitrogen oxides.

The present catalyst is characterized by 0.1 to 10 % by weight of copper oxide in terms of copper metal, 0.1 to 20 % by weight of lanthanum oxide in terms of lanthanum metal, and 0.01 to 12 % by weight of zirconium oxide in terms of zirconium metal, based on the weight of carrier, these metal oxides being supported on a porous ceramic carrier. The metal oxides referred to herein include mixed oxides. That is, it seems that the respective components supported on the surface of the carrier are not only in the respective oxide forms, but also at least partially in the mixed oxide from of the component elements, for example, in the form of La$_2$Cu$_{0.9}$Zr$_{0.1}$O$_4$, etc., and further partially in the form of reaction product with the carrier, for example, in the form of CuAl$_2$O$_4$ when the carrier is alumina. However, it is difficult to clarify their actual form of presence by the ordinary means, for example, X-ray diffraction procedure, etc.

The present catalyst can be prepared by impregnating a porous ceramic carrier for example, consisting mainly of alumina with a solution containing predetermined amounts of salts of copper, lanthanum and zirconium, or placing the solution onto the porous ceramic carrier, and calcining the resulting carrier at an appropriate temperature, desirably 400° to 1,000°C.

The catalyst thus obtained acts effectively at a temperature of 200°C or higher, preferably 250°C or higher, even in the presence of oxygen, for the reaction of NOx with carbon monoxide.

In the case of flue gas from boilers. etc., no reducing gas is usually contained in the flue gas, and therefore the reducing gas such as hydrogen or ammonia is added thereto, as already described above. Above all, the ammonia addition or blowing is very advantageous for the following reasons:

1. Ammonia is hard to react with the oxygen existing in the boiler flue gas, and selectively acts in the reduction reaction of NOx. Thus, a high NOx conversion can be expected.

2. It is simple to handle the ammonia, and a much space is not required for its storage.

3. Ammonia is cheap.

4. Ammonia is less toxic, even if it is discharged in the unreacted state.

The present catalyst have a very characteristic catalytic action upon such reaction of ammonia with NOx. Contrary to the common sense that the reduction reaction of NOx by ammonia efficiently proceeds in the presence of oxygen at a temperature of 250°C or less, the reduction reaction of NOx by ammonia can be carried out with good efficiency in a temperature range of 250° to 500°C at a higher oxygen concentration, if there are sulfur oxides such as $SO_2$.

This means that $SO_2$ acts upon the catalyst in the temperature range of 250° to 500°C not as a poison, but as a promoter to increase a selectivity of the reaction of ammonia with NOx and suppress the oxidation reaction of ammonia by oxygen.

Detail of the action and mechanism of said $SO_2$ has not been clarified yet, but result of various experiments allows the following presumption. That is, $SO_2$ contained in the gas is adsorbed onto a catalyst on a surface layer of the carrier, but the $SO_2$ has a relatively strong bondage with oxygen ions in the oxide, and is said to serve as an active center of the catalyst. The active center acts on, for example, NO. in the following manner:

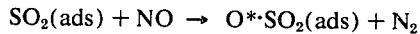

$$SO_2(ads) + NO \rightarrow O^*\cdot SO_2(ads) + N_2$$

$O^*SO_2(ads)$ formed through the reaction of NO with the active center acts upon $NH_3$ in the following manner:

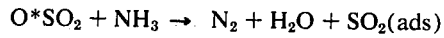

$$O^*SO_2 + NH_3 \rightarrow N_2 + H_2O + SO_2(ads)$$

On the whole, the reduction reaction of NO by ammonia proceeds. $SO_2(ads)$ and $O^*SO_2(ads)$ referred to herein present the reduction state and oxidation state, respectively, of the adsorbed center.

The reaction that proceeds through oxidation and reduction of $SO_2$ - adsorbed active center as described above is quite different in mechanism from the reaction taking place on the surface of platinum catalyst, etc., and no oxidation reaction of ammonia by oxygen is therefore hard to take place even at a temperature of 300°C on higher in the former case, and it seems that the reaction of ammonia with NOx proceeds efficiently and selectively.

As described above, the bondage of $SO_2$ with the catalyst oxide is relatively strong, and therefore is $SO_2$ is once adsorbed onto the catalyst oxide by some means, the reduction reaction of NOx by ammonia can then sufficiently rapidly and selectively proceed in the presence of oxygen in a temperature range of 250° to 500°C without any presence of $SO_2$. This is particularly effective for conversion of NOx contained in flue gas containing no $SO_2$ almost at all, for example, a flue gas from liquid natural gas-firing boilers.

The present invention has the following further advantages on account of the fact that the effective temperature range of the present invention includes a temperature range of flue gas at an outlet of economizer attached to a boiler system:

1. NOx in the flue gas can be converted without any sacrifice of thermal efficiency as an entire boiler system.

2. The present invention can be applied to the existing boiler system without any change in design or any large modification of the entire system.

Porous ceramic carrier used in the present catalyst indudes, for example, Δ-alumina, α-alumina, alumina-silica, zirconia, magnesia, and cordielite. These ceramics can be used in a mixture of at least two thereof.

However, as already described, some of the present ceramic carriers reacts with oxide components of the present catalyst to change the structure of the catalyst components. For example, in the case of γ-alumina (γ-$Al_2O_3$) carrier, the oxide components of the catalyst react with γ-alumina to produce structures of $CuAl_2O_4$, etc., and a catalyst of the most desirable structure is not obtained, resulting in some reduction in the activity of the catalyst. As a result of the investigations of the reactivity of the oxide components of the present catalyst with many ceramic carriers, it has been found that such carriers as $ZrO_2$, $ZrO_2$ stabilized with CaO or MgO, MgO cordielite (mixed oxides consisting of $Al_2O_3$, $SiO_2$ and MgO), α-$Al_2O_3$, etc. do not react with the oxide components of the present catalyst.

Therefore, it is desirable to use at least one of porous ceramic carriers selected from a group consisting of zirconia, magnesia, α-alumina, cordielite, and zirconia stabilized with calcia or magnesia, as the porous ceramic carrier for the present catalyst. However, γ-alumina or ceramics consisting mainly of γ-alumina have a very excellent property, because they have the largest specific surface area among the porous ceramic carriers produced according to the ordinary industrial means. Naturally, this means that more portions take part in catalytic action per equal volume. Furthermore, γ-alumina is advantageously cheap.

When a layer of the catalyst oxides are formed in a thickness of 1 $\mu$ or more on a carrier of said γ-alumina or ceramics consisting mainly of γ-alumina having said features, said reaction of the catalyst oxides with the carrier is hard to take place at or near the surface of the carrier and thus the oxides at or near the surface can be kept at the desired component ratio. That is, the catalyst has an excellent catalytic effect. Of course, the part having a different composition from the desired component ratio, that is, the part at which the layer of the catalyst oxides is formed in a thickness of less than 1 $\mu$, can take part in the reaction.

The ceramic carrier can be used in any shape, for example, in spherical, pellet-form, amorphous and granular shapes, but tubular carriers having open ends, aggregates of the tubular carriers, or Rasching ring-shaped carriers (including Raschig ring carriers) have better effects for the following reasons:

The present catalyst has very excellent characteristics, and for example, when the catalyst is applied to the reduction reaction of NOx by ammonia, the NOx conversion exceeds 98 % even if a time if contact with the catalyst is 0.15 seconds, depending upon the experimental conditions. In such a case of the catalyst having a large reaction rate constant, the conversion is strongly influenced by the diffusion resistance of boundary layer due to the diffusion of reactant species, and it is apparent that the excellent characteristics of the catalyst cannot be fully utilized when such an influence is not duly taken into consideration. That is, when a stoichiometric amount of ammonia necessary to reduce NO contained in the flue gas is added to the flue gas, it is experimentally confirmed that the conversion by the present catalyst can be given by the following formula:

$$C_{NO}/C_{NO}^0 = \exp\left(-A \cdot \frac{k\mu}{k+\mu}\right) \quad (1)$$

$C_{NO}^0$: NO concentration at the inlet of the catalyst-packed layer
$C_{NO}$: NO concentration at the outlet of the catalyst-packed layer
$A$: contact time
$k$: reaction rate
$\mu$: diffusion rate in boundary layer Therefore, if the diffusion resistance is small, and $\mu$ is very large, compared with the reaction rate, the formula will be given below:

$$C_{NO}/C_{NO}^0 = \exp(-Ak) \quad (2)$$

The conversion is not influenced by the diffusion, but when the diffusion rate decreases and approaches to the reaction rate, the ratio $C_{NO}/C_{NO}^0$ increases according to the formula (2), and consequently the percent conversion $[(1 - C_{NO}/C_{NO}^0) \times 100]$ is lowered. For example, if a relation of $k << \mu$ is realized and there is no influence of the diffusion layer, the percent conversion of 90 % is attained, but if a relation of $k = \mu$ is realized, that is if the diffusion rate is equal to the reaction rate, the percent conversion is reduced to 68 %. The diffusion rate $\mu$ is generally expressed by the following formula:

$$\mu = \frac{\alpha D}{d} \quad (3)$$

$\alpha$: shape factor of the catalyst
$D$: diffusion constant
$d$: thickness of diffusion layer Among these parameters, $D$ depends upon the kind of gas, but $\alpha$ depends upon the shape of the catalyst, and $d$ upon the flow velocity of gas. Especially, $d$ is inversely proportional to the flow velocity of gas, and thus the diffusion rate in a boundary layer can be increased with increase in the flow velocity.

However, the pressure drop is actually increased with the increase in the flow velocity, and therefore the flow velocity cannot be increased over some value. For example, when the flow velocity is set to 0.5 m/sec in the case of spherical catalyst having diameter of 2 mm, there develops a pressure drop of 2.5 mm $H_2O$ per cm of the height of packed layer, and there will develop actually a pressure drop of 250 mm $H_2O$ for 1 m of the height of the packed layer. This is a very serious problem in design of the apparatus.

In the case of tubular ceramic carriers having open ends, aggregates of said tubular carriers, or ring-shaped carriers including Raschig ring carriers, the shape factor $\alpha$ of the formula (3) is large, and consequently when they are actually used for conversion of NOx of the flue gas or exhaust gas, the pressure drop and diffusion resistance in the boundary layer are small, and a large percent NOx conversion is obtained.

Now the present invention will be described in detail below by way of examples.

EXAMPLE 1

In 1 l of water are dissolved 0.045 moles of cupric nitrate [$Cu(NO_3)_2 \cdot 6H_2O$], 0.1 mole of lanthanum acetate, and 0.005 moles of zirconyl nitrate, and 500 g of spherical, porous $\alpha$-alumina carrier having an average particle size of 4 mm, and pore volume of 0.35 ml/g is immersed in the resulting solution, and boiled for about one hour. The alumina carrier is taken out of the solution, dried, and calcined in air at 900°C for 1 hour, whereby catalysts holding 0.8 % by weight of copper oxide in terms of copper metal, 3.6 % by weight of lanthanum oxide in terms of lanthanum metal, and 0.18 % by weight of zirconium oxide in terms of zirconium metal, based on the weight of the carrier, are obtained.

The resulting catalysts are packed in an iron pipe having a diameter of 50 mm and length of 150 mm, and fixed at an exhaust outlet of a 4-cycle gasoline engine having an exhaust capacity of 1,000 cc. A concentration of nitrogen oxides at the outlet of the catalyst-packed pipe is 35 ppm when measured at 2000 rpm of engine running. The concentration is 1/120 of the concentration obtained when no catalyst is used, and 99.2 % of NOX is converted.

EXAMPLE 2

In 1 l of water are dissolved 0.09 moles of copper acetate, 0.2 moles of lanthanum acetate, and 0.01 moles of zirconyl nitrate, and then 500 g of aluminasilica carriers (90 % alumina-10 % silica) having an average particle size of 3 mm and pore volume of 0.26 ml/g is immersed in the resulting solution, and left standing at rrom temperature for about 1 hour. Then, the carriers are taken out of the solution, dried at 70°C, and calcined at 900°C for 2 hours, whereby catalysts holding 0.3 % by weight of copper oxide in terms of copper metal, 1.1 % by weight of lanthanum oxide, in terms of lanthanum metal and 0.05 % by weight of zirconium oxide in terms of zirconium metal are obtained. The resulting catalysts are filled in a stainless steel reactor tube 1 having an inner diameter of 30 mm, as shown in FIG. 1 to form a catalyst-packed layer 2 having a height of 30 mm. The catalyst particles are supported by glass fibers 6.

The reactor tube is placed in an electric furnace 3, and the temperature of the catalyst-packed layer is kept at the predetermined value. NO (nitrogen monoxide), $SO_2$, oxygen, steam and carbon dioxide are diluted with nitrogen gas, and fed to the reactor tube from an inlet 4 of the reactor tube, and ammonia gas likewise diluted with nitrogen is fed into the reactor tube from an ammonia injection tube 5. The gas composition before the catalyst-packed layer is 735 ppm of NO, 800 ppm of $SO_2$, 570 ppm of ammonia, 1 % oxygen, 12 % water vapor, and 12 % carbon dioxide, the balance being nitrogen, and is identical with the composition of normal boiler flue gas, except that ammonia is contained therein. The amount of ammonia injected is 16 % in excess of the amount stoichiometrically necessary for the reaction with NO. The percent NOx conversion at the outlet 7 of the reactor tube is obtained at a total gas flow rate of 25.4 l/hr (room temperature), that is, a space velocity of 12,000 $hr^{-1}$ by keeping the reactor tube at 350°C for about 24 hours after the start to pass the gas through the catalyst-packed layer, and then keeping the reactor tube at the predetermined temperatures. The result is shown by curve 8 in FIG. 2, and a very good percent NOx conversion is obtained at a temperature of 250°C and higher. The percent NOx conversion shown by the curve 8 does not change even often continuous test 1,000 hours, and it is shown that the present catalysts have a very long effective life.

As Comparative Example 1, the percent NOx conversion is determined for various temperatures of catalyst-packed layer under the same conditions as for the curve 8, using catalysts holding 0.1 % by weight of platinum on alumina carriers in place of the present catalysts, and the result is shown by curve 9 in FIG. 2. The percent NOx conversion is not only low owing to the poisoning of the catalysts by $SO_2$, but also is lowered with higher temperatures than 280°C.

EXAMPLE 3

Boiler flue gas from a fuel oil-fired power station having an output capacity of 10,200 kW is branched by 5 % of total flue gas volume at the outlet of economizer and led to a stainless steel pipe having a diameter of 400 mm, which is thermally insulated with heat-insulating materials.

Three nozzles for ammonia injection are provided on the stainless steel pipe at a position just after the branch point, and a catalyst-packed layer having a thickness of 575 mm is provide in the stainless steel pipe at a downstream position 850 mm distant from the position of the nozzles. The catalysts are porous spheres of alumina-silica (90 % alumina-10 % silica) having diameters of 5 to 7 mm and holding 0.27 % by weight of copper oxide in terms of copper metal, 0.90 % by weight of lanthanum oxide in terms of lanthanum metal, and 0.043 % by weight of zirconium oxide in terms of zirconium metal, prepared in the same manner as in Example 2.

The flue gas temperature at the outlet of the economizer is 354°C, and the flow rate after the branching is 1,300 $Nm^3$/hr (actual flow rate at 354°C after the branching is 2,650 $m^3$/hr). The gas composition at the branching point is 550 ppm of NOx, 940 ppm of $SO_2$ and $SO_3$, 0.8 % oxygen, 13.1 % water vapor and 12.7 % carbon dioxide, the remaining being nitrogen.

From the nozzles for ammonia injection, 0.435 kg/hr of ammonia is injected into the pipe, and the gas right after the catalyst-packed layer is analyzed. The NOx concentration is found to be 3.2 ppm. That is, 99.4 % of NOx is converted, when compared with the NOx concentration of 550 ppm at the outlet of the economizer. No change is observed in the percent NOx conversion even after the test of 2,000 hours. In the present embodiment, the contact time of the flue gas with the catalysts is less than 0.1 second, but almost 100 % of $NO_x$ can be converted even in such a short contact time. Consequently, the thickness of the catalyst-packed layer can be made smaller, and the pressure drop of the boiler system can be also made smaller. This will bring about a very great industrial merit.

EXAMPLES 4 AND 5

One kg of α-alumina (pore volume : 0.51 cc/g, specific surface area: 180 $m^2$/g, average particle size: 5 mm) is dipped and boiled for about 2 hours in a solution containing the raw materials listed in the following table in 1.5 l of water, and then taken out of the solution, dried with hot air, and calcined at 850°C for 2 hours, whereby catalysts are obtained. However, in the case of Example 5, the γ-alumina is heated at 500°C for one hour after the drying, dipped again in said aqueous solution, dired and then heated. A run of these operations is repeated four times, and then the γ-alumina is dried, while spraying an aqueous solution containing 4.8 g/l of zirconium oxychloride over the γ-alumina by a spray, and then calcined at 900°C for 2 hours.

| Example No. | Raw materials | | | |
|---|---|---|---|---|
| | Copper acetate (g) | Lanthanum acetate (g) | Zirconyl nitrate (g) | Zirconium oxychloride (g) |
| Example 4 | 6.5 | 4.6 | 0.54 | |
| Example 5 | 95 | 120 | | 6 |
| Comp. Example 2 | 0.65 | 136 | 0.54 | |
| Comp. Example 3 | 65 | 91 | 0.01 | |
| Comp. Example 4 | 65 | 0.46 | 0.54 | |

These catalysts hold metals in the form of its oxides in the amounts as shown in the following table, based on the weight of the carriers.

Percent NOx conversions of these catalysts are determined in the same manner as in Example 2. The percent NOx conversions at 350°C are given below, when a gas containing 300 ppm of NOx, 1000 ppm of $SO_2$, 220 ppm of $NH_3$, 12 % $CO_2$, 3 % $O_2$ and 12 % $H_2O$, the remaining being $N_2$, is passed through the catalysts at a space velocity of 12000 $hr^{-1}$.

| Example No. | Composition (% by weight as the amount of metal) | | Percent NOx conversion (%) |
|---|---|---|---|
| Example 4 | Cu | 0.10 | 74 |
| | La | 0.10 | |
| | Zr | 0.01 | |
| Example 5 | Cu | 10 | 96 |
| | La | 20 | |
| | Zr | 12 | |
| Comp. Example 2 | Cu | 0.01 | 27 |
| | La | 3.0 | |
| | Zr | 0.01 | |
| Comp. Example 3 | Cu | 1.0 | 58 |
| | La | 2.0 | |
| | Zr | 0 | |
| Comp. Example 4 | Cu | 1.0 | 45 |
| | La | 0.01 | |
| | Zr | 0.01 | |

Said metal oxides effectively work for the NOx conversion, even if the oxides are held on the carrier in excess of said specific amounts, but the oxides are very liable to be removed from the carrier, and the catalysts themselves are economically disadvantageous.

EXAMPLE 6

One kg of the same γ-alumina as in Example 4 is dipped in a solution containing 8.5 g of copper acetate, 4.6 g of lanthanum acetate, and 0.54 g of zirconyl nitrate in 1.5 l of water, and then treated in the same manner as in Example 4, whereby catalysts are prepared. The catalysts hold 0.13 % by weight of copper oxide in terms of copper metal, 0.10 % by weight of lanthanum oxide in terms of lanthanum metal and 0.012 % by weight of zirconium oxide in terms of zirconium metal. The catalysts are dipped in a 0.5 % alcohol solution of β-naphthylmercaptan, and then heated at 480°C for 2 hours to make sulfur oxide present on the catalysts. The resulting catalysts are filled in the same apparatus as described in Example 2, and a gas containing 305 ppm of NOx, 220 ppm of $NH_3$, 12 % $CO_2$, 3 % $O_2$, and 12 % $H_2O$, the remaining being $N_2$ is passed through the catalysts at 350°C and a space velocity of 12,000 $hr^{-1}$. The percent $NO_x$ conversion is 75 %.

As Comparative Example 5, the catalysts prepared in the same manner as about, but without making the sulfur oxide present on the catalysts, that is, without dipping in the alcohol solution of β-naphthylmercaptan and successive heating, are tested, but the present NOx conversion is 53 %.

EXAMPLE 7

In 1 l of water are dissolved 0.09 moles of copper acetate, 0.2 moles of lanthanum acetate and 0.01 mole of zirconyl nitrate, and then 500 g of alumina carrier having an average particle size of 3 mm and pore volume of 0.38 ml/g is dipped in the resulting solution, and boiled for about one hour. Then, the carriers are taken out of the solution. The carriers are heated at 450°C for 1 hour, again dipped in the solution having same composition as above, and boiled for 30 minutes, Then, the carriers are taken out of the solution, dried, and then calcined at 900°C for 2 hours, whereby catalysts holding 4 % by weight of copper oxide in terms of copper metal, 7.2 % by weight of lanthanum oxide in terms of lanthanum metal and 0.9 % by weight of zirconium oxide in terms of zirconium metal can be obtained. The catalysts thus obtained are packed in a reactor tube kept at 380°C, and are brought in contact with a gas containing 700 ppm of ammonia, 180 ppm of $SO_2$ and 5 % oxygen, the remaining being nitrogen, for about 10 hours, to make $SO_2$ adsorb onto the catalysts.

The catalysts bearing $SO_2$ are filled in the same reactor tube as described in Example 2, and a gas containing 735 ppm of NO, 490 ppm of ammonia, 1 % oxygen, 12 % carbon dioxide and 12 % water vapor, the remaining being nitrogen (free from $SO_2$) is passed through the cstalyst-packed layer at a flow rate of 762 l/hr (space velocity: 36,000 $hr^{-1}$ at room temperature). The present NOx conversions at various temperatures of the catalyst-packed layer are shown by curve 10 in FIG. 3, where the percent NOx conversions of 94 % or more are attained in the temperature range of 250° to 500°C.

On the other hand, the catalysts prepared in the same manner but without said $SO_2$ adsorption and tested under the same conditions as above to investigate the percent NOx conversion. The result is given by curve 11 in FIG. 3. The effect of the presence of the sulfur oxide on the catalysts is apparent from comparison of the curve 10 with the curve 11.

EXAMPLE 8

One kg each of porous carriers having an average particle size of 4 mm, each consisting of $ZrO_2$; CaO-stabilized $SrO_2$; MgO-stabilized $ZrO_2$; MgO; mixed oxides of 50 % by mole of $Al_2O_3$-25 % by mole of $SiO_2$-25 % by mole of MgO; α-$Al_2O_3$, are dipped in a solution containing 0.25 moles of lanthanum acetate, 0.13 moles of copper acetate and 0.014 moles of zirconium nitrate in 1 l of water, and boiled to impregnate the carriers with said mixed salts. The pore volume of these carriers is about 0.2 ml/g for every carriers. After the impregnation, the remaining aqueous solution is removed from the carrier by decantation, and the resulting carriers are heated in air at 900°C for one hour, whereby catalyst holding 2.5 % by weight of total of mixed lanthanum, copper and zirconium oxides in terms of their metals can be obtained. According to X-ray and electronic beam diffractions of the surfaces of catalysts thus obtained as well as the inside surfaces of pores, it is confirmed that the inside surfaces of pores of the carriers as well as the surfaces of the carriers are covered with oxides of lanthanum-copper-zirconium system having the same composition as that of said aqueous solution.

The catalysts thus obtained are filled in iron pipes having a diameter of 150 mm and length of 150 mm, and the filled pipes are fixed to exhaust gas outlets of 4-cycle engines having an exhaust gas capacity of 1000 cc. Concentrations of nitrogen oxides at the outlets of the catalyst-packed pipes are measured at 2000 rpm of the engines. The concentrations are 35 ppm for the $ZrO_2$ carriers, 38 ppm for the CaO-stabilized $ZrO_2$ carriers, 40 ppm for the MgO-stabilized $ZrO_2$ carriers, 39 ppm for the MgO carriers, 35 ppm for the mixed oxide carriers of 50 % by mole of $Al_2O_3$-25 % by mole of $SiO_2$-25 % by mole of MgO, and 43 ppm for the α-$Al_2O_3$ carriers. These concentrations are about 1/160 – 1/170 times the concentration of nitrogen oxides when no catalysts are used.

EXAMPLE 9

The catalysts obtained in Example 8 are each filled in stainless steel reactor tubes 1 having an inner diameter of 300 mm, as shown in FIG. 1, to form catalyst-packed layers 2 having a length of 30 mm in the reactor tubes. The catalyst particles are supported by glass fibers 6. The reactor tubes are each inserted into electric furnaces 3, and the catalyst-packed layers 2 are kept at a predetermined temperature. From the reactor tube inlet 4, NO, $SO_2$, $O_2$, water vapor and $CO_2$ are supplied to the reactor tube after dilution with nitrogen, and from the injection tube 5 an ammonia gas is supplied to the reactor tube likewise after dilution with nitrogen. The gas just before the catalyst layer contains 735 ppm of NO, 800 ppm of $SO_2$, 570 ppm of $NH_3$, 1 % $O_2$, 12 % water vapor and 12 % $CO_2$, the remaining being nitrogen. The gas composition is identical with the composition of normal boiler flue gas except that ammonia is contained therein. In that case, the amount of ammonia injected is 16 % in excess of the stoichiometrical amount.

In the case of total flow rate of 381 l/hr at room temperature, that is, space velocity of 18,000 $hr^{-1}$, the NOx concentration at the outlet of the reactor tube is measured for temperatures of catalyst-packed layer ranging from 250° to 500°C by keeping the catalyst-packed layer at 350°C for about 24 hours from the start to make the gas pass through the reactor tube, and then adjusting the temperature to the predetermined one, and relations between the temperatures of catalyst-packed layer and the percent NOx conversion are determined. The results are shown in FIG. 4. Curve 12 shows relations between the catalyst temperature and percent NOx conversion for the $ZrO_2$ carriers; curve 13 for the CaO-stabilized $ZrO_2$ carriers; curve 14 for the MgO-stabilized $ZrO_2$ carriers; curve 15 for the MgO carriers; curve 16 for the mixed oxide carriers of 50 % by mole of $Al_2O_3$-25 % by mole of $SiO_2$-25 % by mole of MgO; curve 17 for the $\alpha$-$Al_2O_3$ carries. Very good percent NOx conversions are obtained at a temperature of 250°C or higher. The percent NOx conversions shown by these curves are not changed even after a continuous test of 5,000 hours, and it is proved that the percent catalysts have a very long effective life. The percent NOx conversion of the catalysts obtained from $\alpha$-alumina carriers in the same manner as in Example 8 is shown by curve 18 in FIG. 4.

EXAMPLE 10

One kg each of porous carriers having an average particle size of 3 mm, each consisting of $ZrO_2$; CaO-stabilized $ZrO_2$; MgO-stabilized $ZrO_2$; MgO; mixed oxides of 50 % by mole of $Al_2O_3$-25 % by mole of $SiO_2$-25 % by mole of MgO; $\alpha$-$Al_2O_3$, are dipped in a solution containing 0.045 moles of cupric nitrate ($Cu(NO_3)_2 \cdot 6H_2O$), 0.08 moles of lanthanum acetate and 0.005 moles of zirconium nitrate in 1 l of water to impregnate the carriers with the solution. The pore volume of the carriers is about 0.15 ml/g for every carriers. After the impregnation, the remaining aqueous solution is removed from the carriers by decantation, and the resulting carriers are heated in the air at 900°C for 1 hour, whereby the catalysts bearing 1.3 % by weight of total of copper, lanthanum and zirconium oxides in terms of their metals can be obtained. According to X-ray and electronic beam diffraction of the surfaces and inner surface area of the pores of the catalysts, it is confirmed that the surface and inner surface area of the pore of the carriers are covered by oxides of lanthanum-copper-zirconium system having the same composition as that of said aqueous solution.

The catalysts thus obtained are tested to determined the percent NOx conversion in the same manner as in Example 9, and it is found that the percent NOx conversion of about 99.7 % can be attained in a temperature range of 300° to 500°C for all the catalysts.

EXAMPLE 11

One kg each of the same six kinds of the porous carriers as in Example 8 are dipped in a solution containing 0.09 moles of copper acetate, 0.15 moles of lanthanum acetate and 0.01 moles of zirconyl nitrate in 1 l of water to impregnate the carriers with the solution. After the impregnation, the remaining aqueous solution is removed from the carriers by decantation, and the resulting carriers are heated in the air at 800°C for 1 hour, whereby the catalysts bearing 1.7 % by weight of total of copper, lanthanum and zirconium oxides in terms of their metals are obtained. According to X-ray and electronic beam diffraction of the surfaces and inner area of the pores of the resulting catalyst, it is confirmed that the surfaces and inner area of the pores of the catalysts are covered by oxides of lanthanum-copper-zirconium system. These catalysts are each filled in reactor tubes kept at 380°C, and are activated by passing a gas containing 700 ppm of ammonia, 1,700 ppm of $SO_2$ and 5 % oxygen, the remaining being nitrogen, through the reactor tubes for about 10 hours.

The catalysts thus activated are each filled in the same reactor tubes as in Example 2, and a gas containing 735 ppm of NO, 490 ppm of ammonia, 1 % oxygen, 12 % carbon dioxide and 12 % water vapor, the remaining being nitrogen (the gas being free from $SO_2$) is passed through the catalyst-packed layers each at a flow of 1,143 l/hr (space velocity: 54,000 $hr^{-1}$ at room temperatures). When the temperature of catalyst-packed layers is 350°C, percent NOx conversion of 97.5 + 2 % can be attained.

On the other hand, the percent NOx conversion of catalysts that are not activated with said $SO_2$ is investigated, and found to be 80 %. It is evident from the present example that, when the present catalysts of oxides of lanthanum-copper-zirconium system are used for the gas containing no $SO_2$, activation of the catalysts by $SO_2$, etc. before the use is very effective.

EXAMPLE 12

One kg of $\gamma$-alumina carriers having an average particle size of 4 mm (pore volume: 0.4 ml/g, BET surface area: 250 $m^2$/g) is dipped in a solution containing 0.26 moles of lanthanum acetate, 0.13 moles of copper acetate, and 0.014 moles of zirconyl nitrate in 1 l of water, and boiled to impregnate the carriers with these mixed salts. After the impregnation, the remaining aqueous solution is removed from the carriers by decantation, and the resulting carriers are dried at 120°C. When the resulting carriers are heated in the air at 900°C for 1 hour, materials containing lanthanum, copper and zirconium partly migrated into crystal lattice of $\gamma$-alumina on the inner area of the carriers are obtained, and have an activity as a catalyst for converting the nitrogen oxides, but more excellent catalysts can be obtained in the following manner.

About 100 ml of said aqueous solution is uniformly sprayed onto said direct carriers, and then the carriers are dried at 110°C. After the drying, about 100 ml of said aqueous solution is sprayed again onto the dried carriers. These spraying and drying are repeated until approximately 1 l in total of said aqueous solution has been sprayed onto the carriers. After drying, the carriers are heated in the air at 900°C for 1 hour, whereby catalysts having a blackish grey layer consisting only of oxides of lanthanum-copper-zirconium on the surfaces of the carriers are obtained. The resulting carriers bear 6.5 % by weight of total of lanthanum, copper and zirconium oxides in terms of their metals, and show a higher catalytic activity than that of the more catalyst of oxides of lanthanum-copper-zirconium system having the same composition, especially in a range of higher flow rate. In the said former catalytic actions, a catalytic action of reaction product of $\gamma$-alumina with the oxides of lanthanum-copper-zirconium system formed in the pores of the carriers takes part in addition to the catalytic action of the catalysts on the surfaces of the carriers.

The catalysts thus obtained are filled in an iron pipe having a diameter of 50 mm and length of 150 mm, and the pipe is fixed to an exhaust gas outlet of a 4-cycle gasoline engine having an exhaust gas capacity of 1,000 c.c., and a concentration of nitrogen oxides at the outlet of the catalyst-packed pipe are measured at 2,000 rpm of the engine. The concentration is found to be 35 ppm, and is 1/170 times the concentration obtained when no catalysts are used.

EXAMPLE 13

The catalysts having a layer consisting only of oxides of lanthanum-copper-zirconium system on the surfaces of γ-alumina carriers as prepared in the same manner as in Example 12 are filled in a stainless steel reactor tube 1 having an inner diameter of 30 mm, as shown in FIG. 1, to form a catalyst-packed layer 2 having a length of 30 mm within the reactor tube. After the catalyst-packed layer 2 is kept at a predetermined temperature, a gas containing NO, $SO_2$, $O_2$, water and vapor $CO_2$, diluted with nitrogen, is fed to the reactor tube from an inlet 4, and likewise an ammonia gas diluted with nitrogen is injected into the reactor tube from an ammonia injection tube 5. The gas before the catalyst-packed layer contains 735 ppm of NO, 800 ppm of $SO_2$, 570 ppm of $NH_3$, 1 % $O_2$, 12 % water vapor and 12 % $CO_2$, the remaining being nitrogen, and the gas composition is identical with the composition of normal boiler flue gas, except that ammonia is contained in the former gas. The amount of ammonia injected is 16 % in excess of the stoichiometrical amount.

NOx concentration at an outlet 7 of the reactor tube is measured at a total gas flow rate of 381 l/hr at room temperature, that is, a space velocity of 18,000 $hr^{-1}$, by keeping the catalyst-packed layer at 350°C for about 24 hours after the start to make the gas flow through the catalyst-packed layer, and then adjusting the catalyst-packed layer at a predetermined temperature in a range of 250° to 500°C, to determine relations between the temperature of catalyst-packed layer and the precent $NO_x$ conversion.

The result is given by curve 19 in FIG. 5, where a very good percent $NO_x$ conversion is shown at a temperature of 250°C or higher. The percent $NO_x$ conversion shown by this curve is not changed even after continuous test of 5,000 hours, and it is found that the present catalysts have an effective life for a very long period.

Percent $NO_x$ conversion of the catalysts bearing 2.5 % by weight of total of said metal oxides in terms of their metals, prepared merely by dipping the carriers in the aqueous solution of said mixed salts and calcining the impregnated carriers, is measured at varied temperatures of catalyst-packed layer under the same conditions as when the curve 19 is obtained. The result is given by curve 20 in FIG. 5. It is apparent from FIG. 5 that catalysts bearing oxides in a thick layer have an excellent effect when the γ-alumina is used as the carriers.

In FIG. 6, relations between the amount of the aqueous solution sprayed and the percent $NO_x$ conversion at a temperature of the catalyst-packed layer of 350°C are shown, where the aqueous solution having the same composition as described in Example 12 is sprayed onto one kg of γ-alumina carriers, while changing the total amount of the solution. As is evident from FIG. 6, no effect of the spraying is attained so long as the total amount of the solution sprayed is less than 400 ml, but a very remarkable effect of spraying can be obtained, if the total amount of the solution sprayed exceeds 400 ml. However, the effect of spraying is almost saturated, when the total amount of spraying is more than 700 ml. The reason why no influence is given to the percent $NO_x$ conversion, when the amount of the solution sprayed is less than 400 ml, seems that almost all of the mixture of lanthanum-copper-zirconium in the solution sprayed reacts with the carriers, and further the reason why the effect of spraying is increased between 400 and 700 ml seems that a layer consisting only of oxides of lanthanum-copper-zirconium system is started to form locally on the surfaces of γ-alumina within said range, and almost all the surfaces are covered by the layer in the amount of 700 ml sprayed. Furthermore, the fact that no more effebt of the spraying is attained in an amount over 700 ml me[ns that, after the entire surfaces of the carriers have been covered by the catalyst layer, any increase in the layer thickness has no more effect at all. An average thickness of the layer consisting of the catalyst is about 4 μ, when 700 ml of the solution is sprayed onto the carriers, and an average thickness of the layer is about 1 μ, where 500 ml of the solution is sprayed.

EXAMPLE 14

In 1 l of water are dissolved 0.045 moles of cupric nitrate ($Cu(NO_3)_2.6H_2O$), 0.08 moles of lanthanum acetate and 0.005 moles of zirconyl nitrate, and 500 g of spherical, porous γ-alumina carriers having an average particle size of 4 mm and pore volume of 0.35 ml/g are dipped in the resulting solution, and boiled for about one hour. Then, the alumina carriers are taken out of the solution, and dried.

The resulting carriers are calcined as such in the air at 900°C for 1 hour, and the resulting catalysts are referred to as "A" in the present example.

On the other hand, said alumina carriers taken out of said solution, and dried are sprayed with said solution in the same manner as in Example 12, and dried. Said spraying and drying are carried out repeatedly until total 1.5 l of the solution have been added to the carriers. The resulting dried carriers are calcined in the air at 900°C for 1 hour, and the resulting catalysts bearing a layer consisting only of the catalysts on the carrier surfaces are referred to as "B" in the present example.

The catalysts "A" bear 2 % by weight of total of copper, lanthanum and zirconium oxides in terms of their metals on the carriers, based on the weight of the carriers, and the catalysts "B" bear 4.5 % by weight of total of said metal oxides in terms of their metals.

Percent $NO_x$ conversions of these catalysts A and B are determined in the same manner as in Example 13, and it is found that the percent $NO_x$ conversion of the catalysts A is 95 %, whereas that of B is 99.7 % in a temperature range of 300° to 450°C. When the γ-alumina is used as the carriers, the catalysts bearing a thicker layer of oxides of these metals have an excellent effect.

EXAMPLE 15

Catalysts having a layer of catalysts on surface of carriers are prepared only by spraying the aqueous solution used in Example 12 in the same manner as in Example 12, without dipping the carriers in the aqueous solution to impregnate the carriers with the solution, and are tested in the same manner as in Example 12. It is found that the catalysts have almost equal characteristics to those of the catalysts prepared in Example 12, that is, the catalysts, prepared especially by impregnating the carriers with the solution. The catalysts bear 4.5 % by weight of total of the metal oxides in terms of their metals, based on the weight of the carriers.

EXAMPLE 16

In 1 l of water are dissolved 0.09 moles of copper acetate, 0.18 moles of lanthanum acetate, and 0.01 mole of zirconyl nitrate, and porous $\gamma$-$Al_2O_3$ carriers having a diameter of 4 mm are dipped in the resulting solution, and boiled for about one hour. Then, the carriers are taken out of the solution, and dried. Furthermore, 100 ml of the solution having said composition is sprayed onto one kg of the resulting carriers, and then the carriers are dried at 110°C. After the drying about 100 ml of said aqueous solution is further sprayed onto the resulting carriers, and then the carriers are dried. By repetition of these operations, total 800 ml of the aqueous solution is sprayed onto the carriers. Then, the carriers are dried, and then heated in the air at 800°C for 1 hour, whereby catalysts bearing 4 % by weight of total of lanthanum, copper and zirconium oxides in terms of their metals in a layer on the surfaces of the carriers are obtained. The resulting catalysts are filled in a reactor tube kept at 380°C, and activated by passing a gas containing 700 ppm of ammonia, 1,700 ppm of $SO_2$ and 5 % oxygen, the remaining being nitrogen, through the reactor tube for about 10 hours.

The catalysts thus activated are filled in the same reactor tube as in Example 2, and a gas containing 735 ppm of NO, 490 ppm of ammonia, 1.0 % oxygen, 12 % carbon dioxide, and 12 % water vapor, the remaining being nitrogen (the gas being free from $SO_2$) is passed through the catalyst-packed layer at a flow rate of 1,143 l/hr (space velocity: 54,000 $hr^{-1}$ at room temperature). When the temperature of the catalyst-packed layer is 350°C, the percent $NO_x$ conversion is 99.7 %.

On the other hand, the precent $NO_x$ conversion of the catalysts not activated with said $SO_2$ is investigated under the same conditions as above and is found to be 82 %. It is evident from the present example that the activation of the catalysts by $SO_2$ before the use is effective, when the present catalysts of oxides of lanthanum-copper-zirconium system are used for a gas containing no $SO_2$.

EXAMPLE 17

Figure 7:
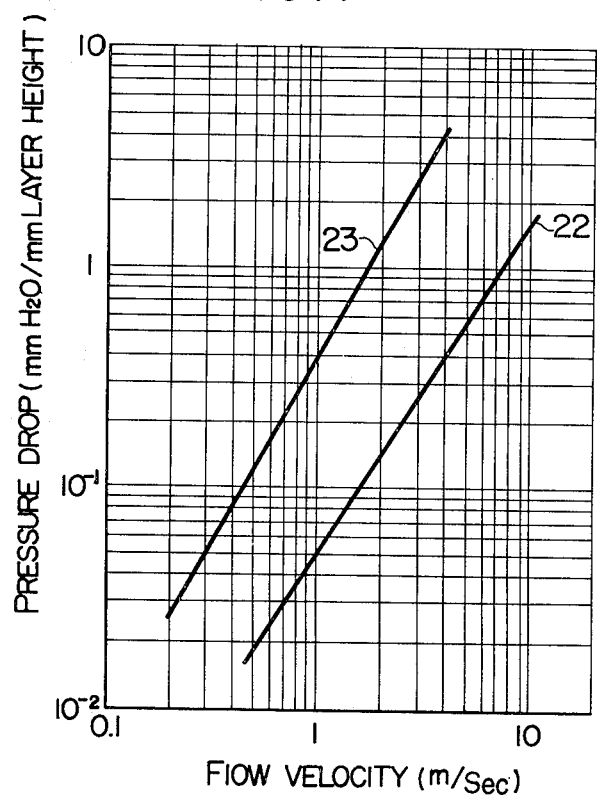
FIG. 7 is a diagram showing relations between the pressure drop of the catalyst-packed layer and gas flow velocity.

In a solution containing 0.5 moles of lanthanum acetate, 0.13 moles of copper acetate and 0.014 moles of zirconyl nitrate in 1 l of water is dipped 250 g of Raschig ring-shaped articles consisting mainly of $\gamma$-alumina and having a height of 5 mm, outer diameter of 5 mm and inner diameter of 4 mm, and boiled for one hour. Then, the articles are taken out of the solution, and dried. The articles are then calcined in the air at 900°C for 1 hours, whereby ring-shaped catalysts are obtained. The resulting catalysts bear 4 % by weight of lanthanum oxide in terms of lanthanum metal, 1 % by weight of copper oxide in terms of copper metal, and 0.16 % of zirconium oxide in terms of zirconium metal. In FIG. 7, relations between flow velocity and pressure drop ($\Delta P$: mm $H_2O$) per unit height of a layer as to the catalyst-packed layer are shown. Plot 22 concerns the case of the present example, and plot 23 is the case of spherical catalysts having a diameter of 5 mm. It is apparent from FIG. 7 that the pressure drop of the catalysts of the present example is considerably smaller than that of the spherical catalysts.

The present catalysts are applied to the reduction reaction of $NO_x$ by ammonia, and its performances are described below.

The catalysts of the present example are filled in the same stainless steel reactor tube 1 having an inner diameter of 20 mm as in FIG. 1 to form a catalyst-packed layer 2 having a layer height of 50 mm in the reactor tube. The catalysts are supported by a stainless steel net. The reactor tube is inserted into an electric furnace, and the catalyst-packed layer is kept at a temperature of 350°C. Nitrogen monoxide, sulfur dioxide, oxygen, water vapor and carbon dioxide, diluted with nitrogen, are supplied to the reactor tube from an inlet 4, and ammonia gas diluted with nitrogen is likewise supplied to the reactor tube from an ammonia injection tube 5. The gas just before the catalyst-packed layer contains 735 ppm of NO, 800 ppm of $SO_2$, 570 ppm of ammonia, 1 % oxygen, 12 % water vapor, and 12 % carbon dioxide, the remaining being nitrogen, and the composition of the gas is identical with that of the normal boiler flue gas, except that ammonia is contained in the former gas. The amount of ammonia injected is 16 % in excess of the stoichiometrically necessary amount.

Figure 8:
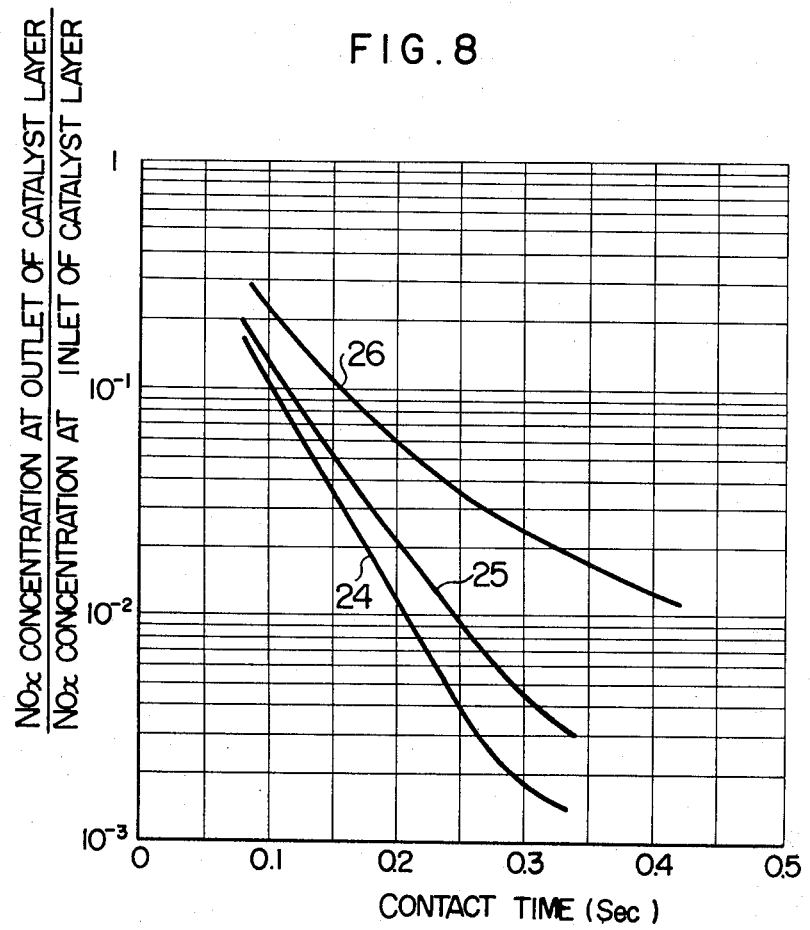
FIG 8 is a diagram showing relations between the contact time and ratio of NOx concentration at the outlet to NOx concentration at the inlet.

$NO_x$ concentration at an outlet 7 of the reactor tube is measured by varying a space velocity, and the result is given by curve 24 in FIG. 8, wherein the contact time, which is inversely proportional to the space velocity, [=3,600/space velocity ($hr^{-1}$)] is plotted on the abscissa and the ratio of $NO_x$ concentration at the outlet to $NO_x$ concentration at the inlet is plotted on the ordinate. Curve 25 of FIG. 8 shows the result obtained by testing the catalysts having a layer of oxides of lanthanum, copper and zirconium on spherical $\gamma$-$Al_2O_3$ carriers having a diameter of 5 mm under the same conditions as above for comparison. It is apparent from FIG. 8 that the catalysts of the present example have a better percent $NO_x$ conversion and better performance than the comparative catalysts given by the curve 25. This seems due to the fact said shape factor of the catalyst, $\alpha$, is larger in the relation of shapes of the catalysts of the present example. Further, in the case of comparative catalysts, the pressure drop due to the catalyst-packed layer becomes very large, when the contact time is short. Curve 26 of FIG. 8 shows relations between the contact time and the ratio of $NO_x$ concentration at the outlet to $NO_x$ concentration at the inlet, when the comparative spherical catalysts having a diameter of 5 mm are filled in a reactor tube of appropriate diameter and its pressure drop is made almost equal to that of the present example. Comparison of the curve 26 with the curve 24 obviously reveals the effect by the shapes of the carriers.

EXAMPLE 18

A honeycomb cylindrical carriers made from cordielite ($Al_2O_3$-MgO-$SiO_2$) having a diameter of 30 mm and height of 30 mm are dipped in 200 ml of an aqueous solution of La, Cu and Zr salts having the same composition as in Example 17, and boiled. Then, the carriers are dired, and heated in the air at 900°C for 1 hour, whereby catalysts having a layer of La, Cu and Zr oxides in terms of their metals on the carriers is obtained. Catalyst component deposited on the carriers are 1 % by weight of lanthanum oxide in terms of lanthanum metal, 0.3 % by weight of copper oxide in terms of copper metal and 0.05 % by weight of zirconium oxide in terms of zirconium metal. The pressure drop of the catalyst-packed layer is 180 mm $H_2O$ at a flow velocity of 2 m/sec. The percent $NO_x$ conversion of the catalysts is measured under the same conditions as in Example 17, and found to be 97 % at a space velocity of 20,000 $hr^{-1}$.

EXAMPLE 19

Boiler flue gas from a fuel oil-fired power station having an output of 10,200 kW is branched from an economizer by 5 % of the total flue gas volume, and led to a stainless steel pipe having a diameter of 400 mm and being thermally insulated with insulating materials. A nozzle for ammonia injection is provided at the stainless steel pipe just after the branching point, and a catalyst-packed layer having a thickness of 400 mm is provided at a downstream position 850 mm distant from the nozzle. Catalysts are alumina-silica cylindrical tubes having an outer diameter of 5.5 mm, inner diameter of 4.5 mm and height of 15 mm and bearing 0.25 % by weight of copper oxide in terms of copper metal, 1.0 % by weight of lanthanum oxide in terms of lanthanium metal, and 0.05 % by weight of zirconium oxide in terms of zirconium metal on the carriers, prepared in the same manner as in Example 17.

The flue gas temperature is 360°C at the outlet of the economizer, and a flow rate after the branching is 2,650 m 3/hr, which corresponds to a gas linear velocity of about 5 m/sec. and a space velocity of 50,000 $hr^{-1}$. The gas at the branching point contains 550 ppm of NO, 940 ppm of $SO_2 + SO_3$, 1.2 % oxygen, 12.1 % water vapor, and 12.0 % carbon dioxide, the remaining being nitrogen. From the ammonia injection nozzle, ammonia is injected into the stainless steel pipe at a rate of 0.435 kg/hr. Analysis of the gas just after the catalyst-packed layer reverals that $NO_x$ concentration is 10.0 ppm. That is, about 98 % of $NO_x$ is converted by the catalyst-packed layer. Pressure drop of the catalyst-packed layer is 230 mm $H_2O$, which admits sufficient practical use.

EXAMPLE 20

In 1 l of water are dissolved 0.09 moles of copper acetate, 0.18 moles of lanthanum acetate, and 0.01 mole of zirconyl nitrate, and porous zirconia tubes having an outer diameter of 5 mm, inner diameter of 4 mm and height of 2 mm were dipped in the resulting solution, and boiled for 1 hour. Then, the tubes are taken out of the solution, heated at 450°C for one hour, again dipped in the solution of the same composition as above, and boiled for 30 minutes.

The tubes are taken out of the solution, dried, and calcined at 800°C for two hours, whereby catalysts bearing 4 % by weight of copper oxide in terms of copper metal, 7 % by weight of lanthanum oxide in terms of lanthanum metal and 0.9 % by weight of zirconium oxide in terms of zirconium metal on the carriers can be obtained. The resulting catalysts are filled in a reactor tube kept at 380°C, and activated with a gas containing 700 ppm of ammonia, 1,700 ppm of $SO_2$, and 5 % oxygen, the remaining being nitrogen, for about 10 hours.

The catalysts thus activated are filled in the same reactor tube as in Example 17, and a gas containing 735 ppm of NO, 490 ppm of ammonia, 1.0 % oxygen, 12 % carbon dioxide and 12 % water vapor, the remaining being nitrogen (the gas being free from $SO_2$) is passed through the resulting catalyst-packed layer at a flow rate of 762 l/hr. (space velocity: 36,000 $hr^{-1}$ at room temperature). Percent $NO_x$ conversion is 98 % when a temperature of the catalyst-packed layer is 350°C.

On the other hand, percent $NO_x$ conversion of the catalysts not activated with said $SO_2$ is investigated under the same conditions as above, and found to be $SO_2$. It is apparent that the activation of the present catalysts by $SO_2$, etc. before the use is effective, when the present catalysts having La, Cu and Zr as catalyst components are used for the gas containing no $SO_2$.

What is claimed is:

1. A process for reducing nitrogen oxides, which comprises contacting a catalyst comprising a porous ceramic carrier, and 0.1 to 10 % by weight of copper oxide in terms of copper metal, 0.1 to 20 % by weight of lanthanum oxide in terms of lanthanum metal, and 0.01 to 12 % by weight of zirconium oxide in terms of zirconium metal, based on the weight of the carrier, the metal oxides being held on the carrier, with a gas containing a nitrogen oxide in the presence of ammonia and a sulfur oxide in a temperature range of 250° to 500°C, thereby reducing said nitrogen oxide.

2. A process according to claim 1, wherein said ceramic carrier is selected from the group consisting of γ-alumina, zirconia, magnesia, α-alumina, cordielite, calcia-stabilized zirconia and magnesia-stabilized zirconia.

3. A process according to claim 1, wherein said ceramic carrier is selected from the group consisting of zirconia, magnesia, α-alumina, cordielite, calcia-stabilized zirconia, and magnesia-stabilized zirconia are used.

4. A process according to claim 1, wherein said ceramic carrier consists mainly of γ-alumina, the thickness of the oxides being held on the surfaces of said carrier being 1 $\mu$ or more.

5. A process according to claim 1, wherein said ceramic carrier is composed of tubular materials having open ends, aggregates of said tubular materials or ring-like materials.

6. A process according to claim 1, wherein the temperature range is 300° to 450°C.

7. A process for reducing nitrogen oxides, which comprises contacting an activated catalyst comprising a porous ceramic carrier, and 0.1 to 10 % by weight of copper oxide in terms of copper metal, 0.1 to 20 % by weight of lanthanum oxide in terms of lanthanum metal, and 0.01 to 12 % by weight of zirconium oxide in terms of zirconium metal, based on the weight of the carrier, said catalyst having been contacted with a gas containing a sulfur oxide or a solution containing a sulfur compound and thereafter heated, with a gas containing a nitrogen oxide in the presence of ammonia at a temperature range of 250° to 500°C, thereby reducing said nitrogen oxide.

8. A process for reducing the nitrogen oxides contained in a gas mixture containing at least one nitrogen oxide and a reducing gas, said process comprising containing said gas mixture with a catalyst comprising a porous ceramic carrier and a catalytic layer on said ceramic carrier, said catalytic layer comprising about 0.1 to 10 % by weight of copper oxide in terms of copper metal, about 0.1 to 20 % by weight of lanthanum oxide in terms of lanthanum metal, and about 0.01 to 12 % by weight of zirconium oxide in terms of zirconium metal, the weight % being based on the weight of said porous ceramic carrier.

9. The process of claim 8, wherein said gas mixture is at a temperature range of about 250°C to about 500°C when contacted with said catalyst.

10. The process of claim 9, wherein said catalyst includes adsorbed sulfur dioxide.

11. The process of claim 10, wherein said gas mixture contains sulfur dioxide.

12. The process of claim 11, wherein the sulfur dioxide adsorbed on said catalyst is supplied from said gas mixture.

13. The process of claim 10, wherein said gas mixture is substantially free of sulfur dioxide.

14. The process of claim 13 further comprising coating said catalyst with a material capable of yielding sulfur dioxide upon heating and heating said catalyst so that sulfur dioxide is liberated by said material and adsorbed by said catalyst.

15. The process of claim 10, wherein said reducing gas is selected from hydrogen and ammonia.

16. The process of claim 15, wherein said gas mixture is formed by admixing said reducing gas with flue gas.

17. The process of claim 10, wherein said gas mixture contains oxygen gas.

18. The process of claim 17, wherein said gas mixture contains carbon monoxide.

19. The process of claim 10, wherein said catalytic layer consists essentially of about 0.1 to 10 % by weight of copper oxide in terms of copper metal, about 0.1 to 20 % by weight of lanthanum oxide in terms of lanthanum metal, and about 0.01 to 12 % by weight of zirconium oxide in terms of zirconium metal, the weight % being based on the weight of said carrier.

20. The process of claim 10, wherein said catalyst is formed by applying an aqueous solution containing heat-decomposable salts of copper, lanthanum and zirconium to said carrier and thereafter calcining the carrier so treated so as to decompose said salts, thereby forming said oxides.

21. The process of claim 10, wherein said catalytic layer has a thickness of at least about 1 $\mu$.

22. The process of claim 21, wherein said catalytic layer has a thickness of about 1 to 4 $\mu$.

23. The process of claim 21, wherein said catalytic layer has a thickness of at least about 4 $\mu$.

* * * * *